Figure 1:
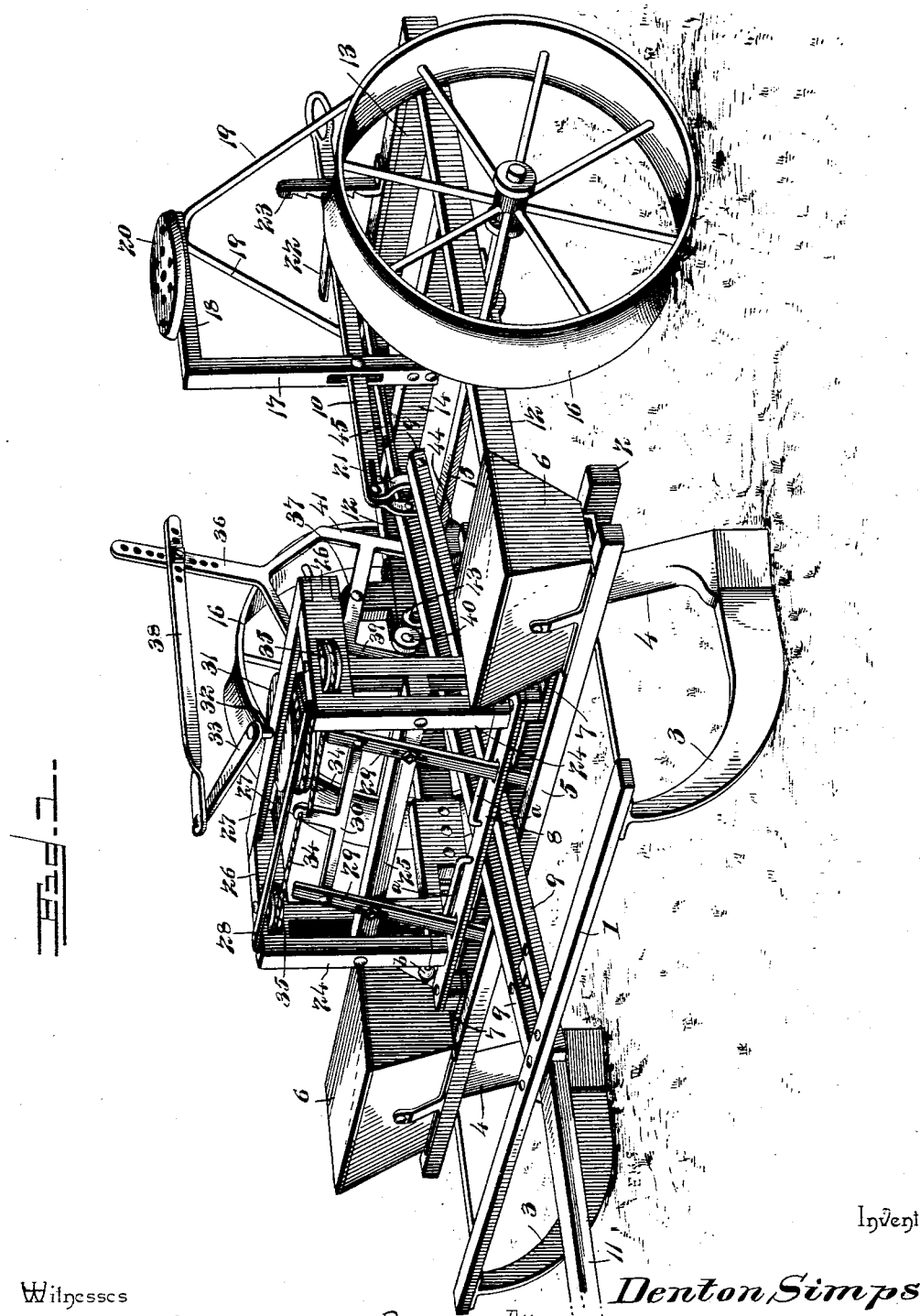

(No Model.) 3 Sheets—Sheet 1.

D. SIMPSON.
CORN PLANTER.

No. 591,937. Patented Oct. 19, 1897.

Witnesses
E. N. Stewart
V. B. Hillyard.

Inventor
Denton Simpson
By C. A. Snow & Co. Attorneys.

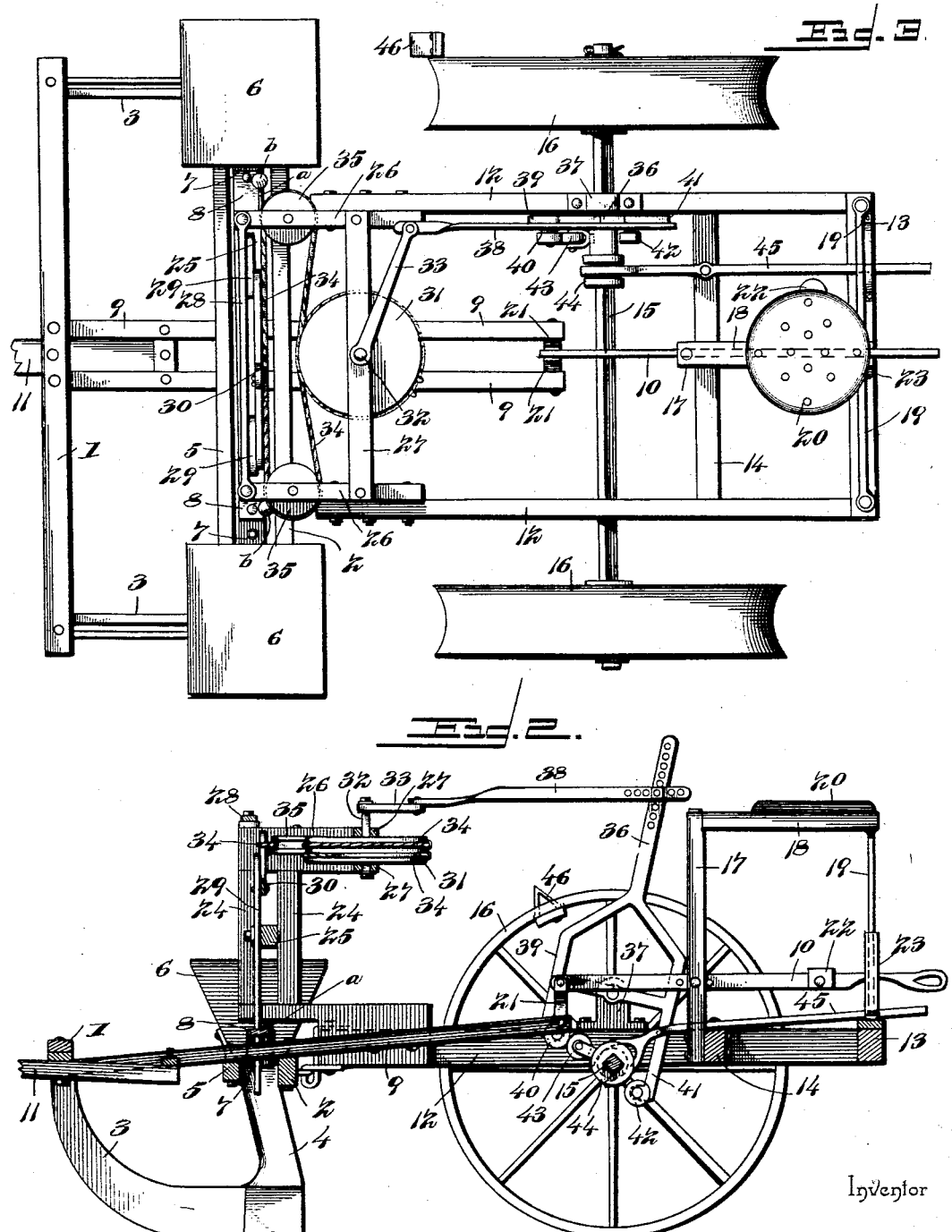

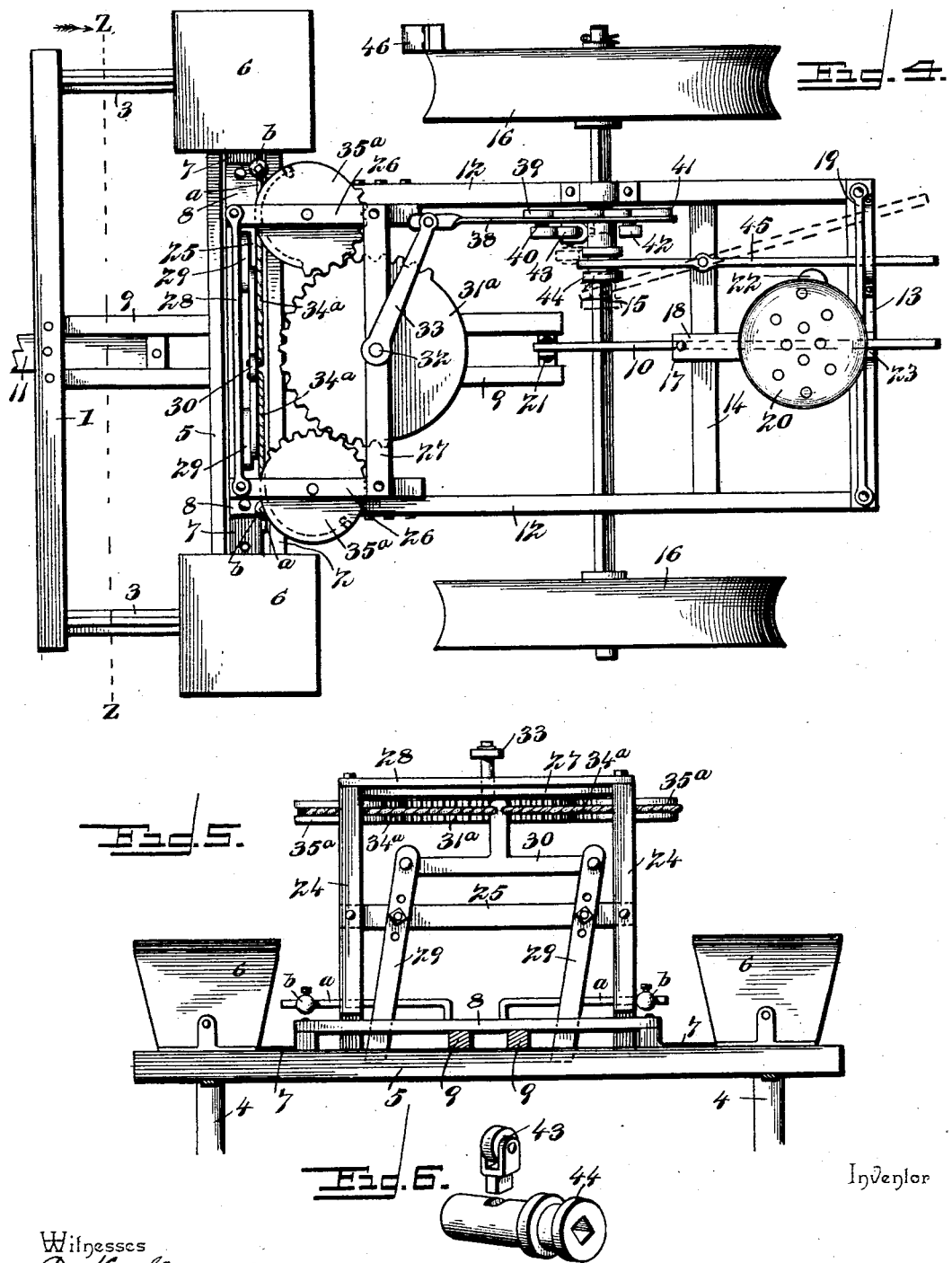

UNITED STATES PATENT OFFICE.

DENTON SIMPSON, OF CENTRE, HOWARD COUNTY, INDIANA.

CORN-PLANTER.

SPECIFICATION forming part of Letters Patent No. 591,937, dated October 19, 1897.

Application filed February 26, 1897. Serial No. 625,174. (No model.)

*To all whom it may concern:*

Be it known that I, DENTON SIMPSON, a citizen of the United States, residing at Centre, in the county of Howard and State of Indiana, have invented a new and useful Corn-Planter, of which the following is a specification.

This invention relates to planters for dropping seed in check-rows or at predetermined intervals apart and which dispense with the usual check-line for actuating the seed-dropping mechanism as the machine is impelled over the field.

The invention deals more particularly with the mechanism for transmitting motion from the axle or power-driven part to the seed controlling and dropping mechanism, whereby the corn or other grain may be planted the required distance apart. The actuating mechanism is positive in operation and does not depend upon the action of a spring or equivalent part for moving the seed-dropping plate, but imparts a direct movement thereto at all times, thereby insuring a dropping of the seed as the machine is drawn over the ground.

The invention also aims to improve the general construction of this class of implements and to increase their effectiveness and to reduce the number of operating parts and to simplify and render certain and definite the action of the working elements, whereby reliance can be placed upon the machine when in operation.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a perspective view of a planter of particular construction having the improvements applied thereto. Fig. 2 is a longitudinal section. Fig. 3 is a top plan view. Fig. 4 is a top plan view of a modification, showing different means for transmitting motion to the seed-slide. Fig. 5 is a transverse section of the upper portion of the planter on the line Z Z of Fig. 4, looking to the rear, as shown by the arrow. Fig. 6 is a detail perspective view of the tappet-wheel and its sleeve.

Corresponding and like parts are referred to in the following description and indicated in the several views of the accompanying drawings by the same reference-characters.

The planter in its general construction comprises a runner-frame and a wheel-frame, which are loosely connected so as to admit of each having an independent movement to adapt itself to the natural condition or rolling surface of the ground. The runner-frame comprises transverse bars 1 and 2, runners or furrow-openers 3, which have connection at their front ends with the transverse bar 1, grain-spouts 4, attached at their lower ends to the rear extremities of the runners and at their upper ends to the bar 2, and a transverse bar 5, arranged adjacent to the bar 2 and secured to the upper ends of the grain-spouts 4. The hoppers 6 are secured to the end portions of the transverse bars 2 and 5 and are located directly above the grain-spouts and communicate therewith. Each hopper has a dropping-plate or slide 7 for controlling the discharge of the grain into the grain-spouts 4, and the dropping-plates are connected by a bar 8, to which a reciprocating motion is imparted in the manner presently to be described for effecting a planting of the seed. Parallel bars 9 are secured at their front ends to the transverse bar 1 at an intermediate point and extend rearwardly and have connection at their rear ends with a lever 10, by means of which the runner-frame can be adjusted to throw the runners into the ground more or less. A pole or tongue 11 is attached at its rear end to the transverse bar 1 and a short distance from its rear end to the bar 1, and passes between the front ends of the parallel bars 9, and is adapted to have the draft applied thereto in the ordinary way.

The wheel-frame comprises longitudinal bars 12, a rear transverse bar 13, and a cross-bar 14, and is mounted upon an axle 15, having ground-wheels 16 applied thereto in the usual way for positively rotating the axle as the machine is propelled forward. A standard 17 is secured at its lower end to the cross-bar 14 and has a seat-bar 18 fastened thereto at its upper end and braced at its rear end by stays 19, secured at their lower ends to the transverse bar 13 near its extremities. A seat 20 is attached to the seat-bar 18 and is located a little to the rear of a line passing perpendicularly through the axle, thereby admitting of the weight of the driver being utilized for counterbalancing the machine. The lever 10 is fulcrumed to the standard 17, and is slotted at its front end to receive a link connection 21, provided between it and the rear ends of the parallel bars 9. This lever extends horizontally and projects in the rear of the wheel-frame, and terminates in a handle to be grasped when it is required to adjust the runner-frame. A foot-rest 22 is attached to the rear portion of the lever and is adapted to be pressed upon by the driver, thereby enabling the adjustment of the runner-frame to be effected without necessitating the dismounting of the driver.

Any well-known means may be resorted to for securing the lever 10 in an adjusted position, and for convenience a notched bar 23 is shown and conveniently attached to the wheel-frame and adapted to be operated so as to be engaged with or disconnected from the lever 10, as required.

A framework is located at the front end of the wheel-frame and rises vertically therefrom, and consists of uprights 24, a transverse bar 25, longitudinal bars 26, connecting the upper ends of the uprights 24, and transverse bars 27, connecting the rear ends of the longitudinal bars 26, the front ends of the longitudinal bars 26 being strengthened and prevented from spreading by a brace 28. Vertically-disposed levers 29 are fulcrumed intermediate of their ends to the transverse bar 25 and have their lower portions passing through openings in the connecting-bar 8, and are united at their upper ends by an inverted T-coupling 30, which has adjustable connection therewith, so as to admit of the stroke of the levers 29 varying without changing the stroke of the part transmitting motion to the said T-coupling. A pulley 31, grooved in its periphery, is journaled between the transverse bars 27 upon a shaft 32, having a crank 33 applied to its upper end, and flexible connections 34—such as cords, chains, or straps—have connection at one end with the pulley 31, and after passing around the same in reverse directions have their opposite ends connected with the T-coupling 30. Each of the connections 34 is seated in a peripheral groove of the pulley 31 and passes around a direction-pulley 35, mounted in an opening formed in the longitudinal bars 26, the direction-pulleys 35 being peripherally grooved to retain the flexible connections 34 in proper position.

A lever 36 is fulcrumed to a block or bracket 37, secured to a longitudinal bar of the wheel-frame, and is forked at its lower end and spans the axle 15, and is connected at its upper end by means of a pitman 38 with the crank 33, the connection being adjustable, so as to admit of the rear end of the pitman 38 being moved toward and from the fulcrum of the lever 36 and transversely of the latter to vary the length of the effective portion between the crank 33 and the said lever. The front fork 39 has a small wheel 40 journaled thereto in a higher plane than the axle, and the rear fork 41 has a corresponding wheel 42 journaled thereto in a plane below the said axle, the two wheels 40 and 42 being in the same longitudinal plane, so as to be engaged by a tappet-wheel 43, carried by a sleeve 44, slidably mounted upon the axle 15 and adapted to rotate therewith.

The parts are so proportioned and relatively located that when the planter is in operation the sleeve 44 will rotate with the axle 15, and the tappet-wheel 43 alternately engage with the wheels 40 and 42 and vibrate the lever 36, and thereby impart a reciprocating movement to the seed-dropping plates through the instrumentality of the connections illustrated and herein referred to at length. A shipper-lever 45 is fulcrumed to the cross-bar 14 and is adapted to engage with the sleeve 44, so as to move the latter upon the axle to throw the planting mechanism out of gear when required.

The hills are indicated by markers 46, which are applied to the rims of the ground-wheels 16, and consist of V-shaped blocks or pieces attached at their inner ends to the inner sides of the rims of the ground-wheels in any convenient way. In the event of the planting not being effected in check-rows the lever 45 is operated to throw the planting mechanism out of gear and is again moved to throw the machine in gear after the parts have been adjusted so as to insure the seed being dropped in transverse alinement or in check-rows. The throw of the bar 8 is limited in each direction by wires or rods $a$, secured thereto and working loosely through openings in the framework, and having stops $b$ at their outer ends.

In Figs. 4 and 5 is shown a construction which dispenses with the use of the flexible connections 34, and this is effected by enlarging the middle pulley $31^a$ and the side pulleys $35^a$, and having their opposing portions intermeshing or provided with cog-teeth. By dispensing with the flexible connections between the pulleys $31^a$ and $35^a$ these parts have a direct and positive movement, but the flexible connections between the pulleys $35^a$ and the inverted T-coupling 30 are preserved, whereby a vibratory movement is imparted to the levers 29 from the pulley $31^a$ upon oscillating it in the manner herein described.

One or both of the ground-wheels may be secured to its axle, as required, any suitable means being provided for attaining this end. When both ground-wheels are secured to the axle, so as to revolve therewith, each will be supplied with a marker, but when one only is caused to revolve with the axle it alone will be supplied with a marker, and for general purposes this construction is preferred, as it obviates relative slipping of the ground-wheels when making turns to recross the field, or for any other purpose.

Having thus described the invention, what is claimed as new is—

1. In a planter, the combination with the seed-dropping mechanism, and a rotatable axle or part, of a vertical lever having its lower end forked and spanning the axle, and having its upper end operatively connected with the seed-dropping mechanism, a sleeve mounted upon the axle to turn therewith and movable thereon, and having a tappet-wheel to alternately engage with the fork members of the vertical lever, and means for shifting the sleeve along the axle for throwing the tappet-wheel into and out of the plane of the forked end of the said vertical lever, substantially as set forth.

2. In a planter, the combination with the seed-dropping mechanism, and a rotatable axle or part, of a vertically-disposed lever having one end operatively connected with the seed-dropping mechanism, and having its opposite end forked and spanning the axle, the fork members being of unequal length and terminating in planes above and below a plane passing horizontally through the axle, a tappet-wheel slidably mounted upon the axle and adapted to alternately engage with the forked terminals of the aforesaid lever, and means for shifting the tappet-wheel along the axle, substantially as set forth.

3. In a planter, the combination of the seed-dropping mechanism, a rotatable axle or part, a vertically-disposed lever having one end forked and spanning the axle, and having the fork members of unequal length and provided at their extremities with small wheels, means for adjustably connecting the opposite end of the lever with the seed-dropping mechanism, a disk slidably mounted upon the axle and bearing a tappet-wheel to alternately engage with the small wheels at the terminals of the forked members of the aforesaid lever, and means for shifting the disk along the axle, substantially as set forth for the purpose described.

4. In a planter, the combination of a reciprocating bar for transmitting motion to the seed-dropping mechanism, an intermediate pulley, side pulleys operatively connected with the intermediate pulley to move in unison therewith, means for oscillating the intermediate pulley, and connections between the side pulleys and the aforesaid reciprocating bar for actuating the latter, substantially as set forth.

5. In a planter, the combination of a reciprocating bar for transmitting motion to the seed-dropping mechanism, a lever having connection with the reciprocating bar, an intermediate and side pulleys connected to move in unison, flexible connections between the side pulleys and the aforesaid lever for vibrating the latter, and means for imparting an oscillating movement to the intermediate pulley, substantially as set forth.

6. In a planter, the combination of a reciprocating bar for transmitting motion to the seed-dropping mechanism, parallel levers having connection at one end with the reciprocating bar, a T-coupling connecting the parallel levers, an intermediate and side pulleys connected to operate simultaneously, means for imparting an oscillating movement to the intermediate pulley, and flexible connections between the side pulleys and the aforesaid T-coupling, substantially as set forth.

7. In a planter, the combination of a reciprocating bar for transmitting motion to the seed-dropping mechanism, means for imparting a reciprocating movement to the said bar, wires or rods having connection with the reciprocating bar and operating loosely through openings in the framework, and extending in opposite directions, parallel with the reciprocating bar, and stops having adjustable connection with the said wires substantially as shown for limiting the throw of the bar in each direction, in the manner set forth for the purpose specified.

8. In a planter, the combination of a reciprocating bar for transmitting motion to the seed-dropping mechanism, stops having connection with the bar for limiting its throw in each direction, an intermediate and side pulleys connected to move in unison, flexible connections between the side pulleys and the reciprocating bar, a vertically-disposed lever having a forked end spanning the axle or rotating part, a pitman adjustably connecting the lever with a crank applied to the shaft of the aforesaid intermediate pulley, a tappet movable upon the axle for vibrating the forked lever, and means for shifting the tappet laterally to throw the planting mechanism into and out of gear, substantially as set forth.

9. In combination, a connecting-bar, vertical levers connected therewith, a T-coupling adjustably connecting the upper ends of the vertical levers, a pulley, means for oscillating the pulley, direction-pulleys at the sides of the oscillating pulley, and flexible connections passing around the oscillating pulley in reverse directions, thence around the direction-pulleys, and having connection with the T-coupling to impart a vibratory movement to the vertical levers for reciprocating the connecting-bar and the seed-dropping plates attached thereto.

In testimony that I claim the foregoing as my own I have hereto affixed my signature in the presence of two witnesses.

DENTON SIMPSON.

Witnesses:
SIMON TROWBRIDGE,
D. M. TREES.